United States Patent [19]
Kato et al.

[11] Patent Number: 4,571,033
[45] Date of Patent: Feb. 18, 1986

[54] ZOOM LENS

[75] Inventors: Masatake Kato; Nozomu Kitagishi, both of Tokyo; Jun Hattori, Kanagawa, all of Japan

[73] Assignee: Canon Kabushiki Kaisha, Tokyo, Japan

[21] Appl. No.: 582,459

[22] Filed: Feb. 22, 1984

[30] Foreign Application Priority Data

Mar. 4, 1983 [JP] Japan .................................. 58-35354

[51] Int. Cl.$^4$ .......................... G02B 9/64; G02B 15/15
[52] U.S. Cl. ..................................... 350/427; 350/423
[58] Field of Search ............................... 350/427, 423

[56] References Cited
U.S. PATENT DOCUMENTS 4,232,942 11/1980 Ikemori .................. 350/423

Primary Examiner—John K. Corbin
Assistant Examiner—Rebecca D. Gass
Attorney, Agent, or Firm—Toren, McGeady, Stanger, Goldberg & Kiel

[57] ABSTRACT

A zoom lens comprising, from front to rear, a positive first lens component, a negative second lens component, a positive third lens component and an image forming or fourth lens component, wherein as zooming occurs from the wide angle to the telephoto position, the first and third lens components are moved axially forward, while the second lens component is held stationary. By giving appropriately specified ranges for numerical values of the focal lengths of the first to third lens components, improvements in the compactness are achieved while still permitting good correction of aberrations.

2 Claims, 30 Drawing Figures

FIG.4-1  FIG.4-2  FIG.4-3
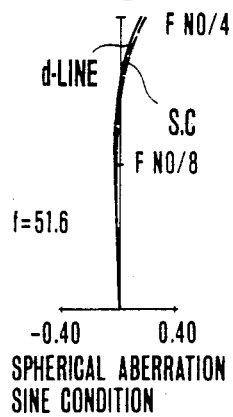 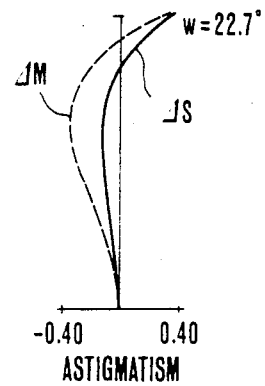 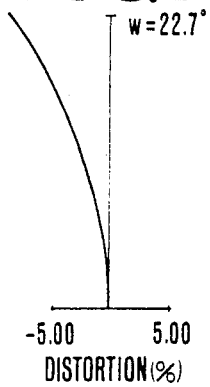
FIG.4-4  FIG.4-5  FIG.4-6
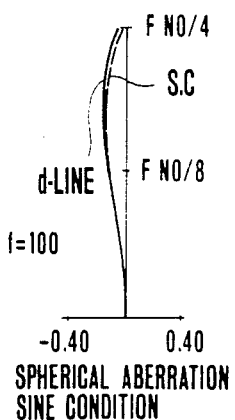 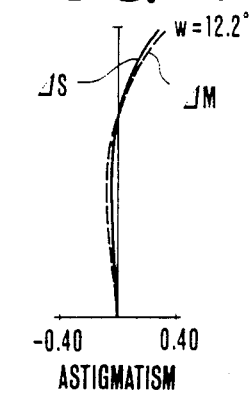 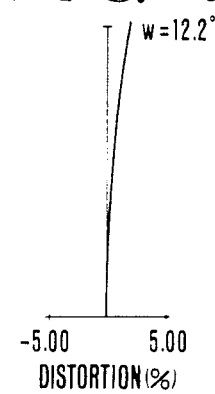
FIG.4-7  FIG.4-8  FIG.4-9
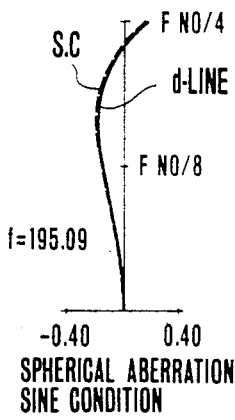 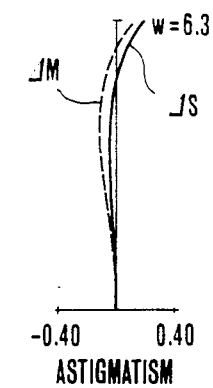 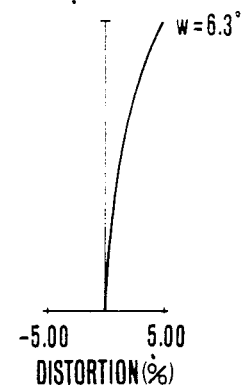

FIG.6-1  FIG.6-2  FIG.6-3
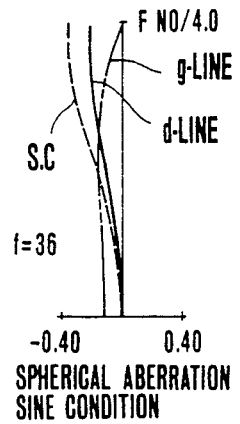 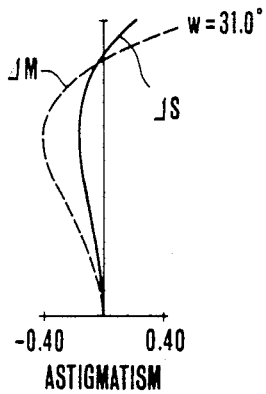 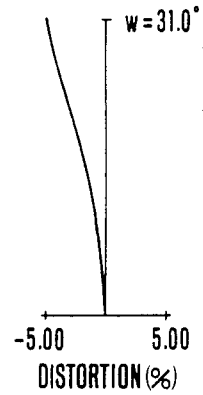
FIG.6-4  FIG.6-5  FIG.6-6
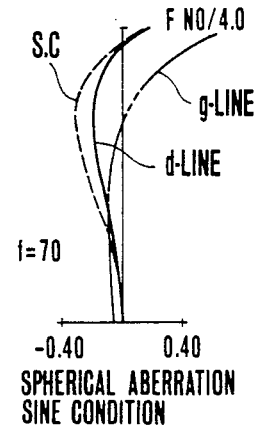 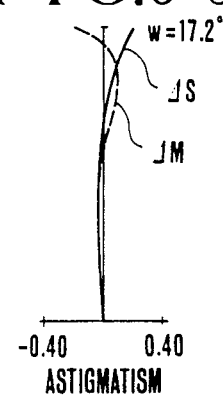 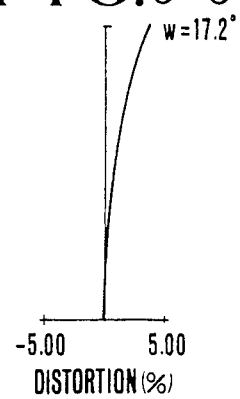
FIG.6-7  FIG.6-8  FIG.6-9
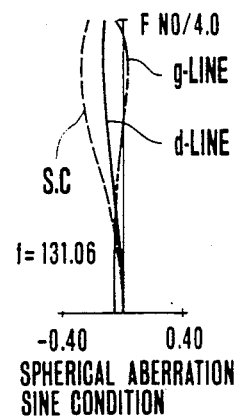 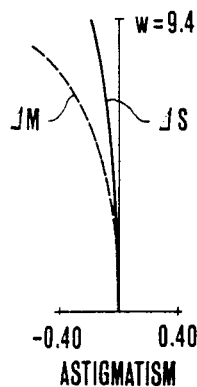 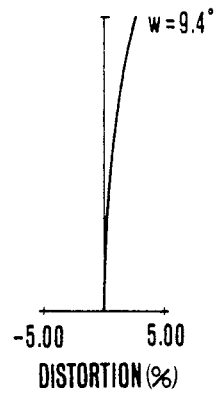

ZOOM LENS

BACKGROUND OF THE INVENTION

1. Field of the Invention

This invention relates to compact zoom lenses, and, more particularly, to zoom lenses of a varifocal ratio as high as 4 which enable a good compromise between the requirements of increasing the varifocal ratio and of limiting the overall dimensions of the lens to a minimum to be achieved while maintaining good stability of aberration correction throughout extended zooming ranges.

2. Description of the Prior Art

Zoom lenses which have been most commonly used include the so-called 4-component zoom lenses which have been proposed in Japanese Laid-Open patent applications Nos. SHO 51-37247, 51-63635 and 53-131852. This 4-component zoom lens is constructed from four lens components of which the first, counting from front, remains stationary during zooming but is axially movable for focusing, the second is axially movable for varying the focal length of the entire system, the third is axially movable for maintaining the constant position of an image plane as the aforesaid second component moves axially to effect zooming, and the fourth remains stationary during zooming, and is used for satisfying determination of a desired longest or shortest focal length and a desired point at which an image of an object is formed.

Since, in such configuration, all duty for increasing the magnification power is given only to the second lens component, for the range of variation of the focal length of the entire system to be extended, measures must be resorted to by strengthening the refractive power of the second lens component, or by increasing the total axial movement of the second lens component. As the refractive power of the second lens component increases, good correction of aberrations becomes more difficult to achieve. Also, the increase in the total movement of the second lens component calls for an increase in the physical length of the zoom lens, thus sacrificing the compactness.

Attempts have been made to eliminate the abovedescribed drawback of the conventional zoom lens by imparting a forward axial movement to the first lens component which was heretofore held stationary when zooming so that the magnification power changing effect of the second lens component is increased, as, for example, disclosed in Japanese Laid-Open patent applications Nos. SHO 53-34539, SHO 54-25747, SHO 54-26754 and SHO 54-30855. However, this method is, because of its use of three lens components for zooming, associated with a very complicated calculation for determining the relation in which the three lens components are moved differently from each other. Also, because the number of parts constituting an operating mechanism for the zoom lens components is increased, the complexity of structure of a mechanical mounting for the zoom lens is increased. This method also is not well suited to reducing the bulk and size of the entire system.

There is also known the 2-component zoom lens comprising a negative front component and a positive rear component, both of which are moved axially but in different relation to effect zooming. Since this type is, however, difficult to achieve a higher zoom ratio, the maximum possible value was limited to about 2.

SUMMARY OF THE INVENTION

It is an object of the present invention to provide a zoom lens of increased range in a compact form while still permitting achievement of good stability of aberration correction throughout the extended zooming range.

Particularly when in application of the invention to the 4-component zoom lens, with a simple zooming arrangement such that only two movable components suffice, a valuable increase in the zoom ratio can be achieved.

The zoom lens of the present invention has features that the lens system comprises, from front to rear, a first lens component of positive power, a second lens component of negative power, a third lens component of positive power, and a fourth or image forming lens component, wherein as zooming is performed from the wide angle to the telephoto position, the first and third lens components are moved axially both forward while holding the second lens component stationary and that in order to well correct aberrations and particularly to ensure good correction of aberrations against zooming, appropriate numerical ranges are given for the refractive powers of the first, second and third lens components.

BRIEF DESCRIPTION OF THE DRAWINGS

FIGS. 2-1 to 2-9, FIGS. 4-1 to 4-9 and FIGS. 6-1 to 6-9 are graphic representations of the aberrations of the lenses of FIGS. 1, 3 and 5 respectively.

DETAILED DESCRIPTION OF THE PREFERRED EMBODIMENTS

Figure 1:
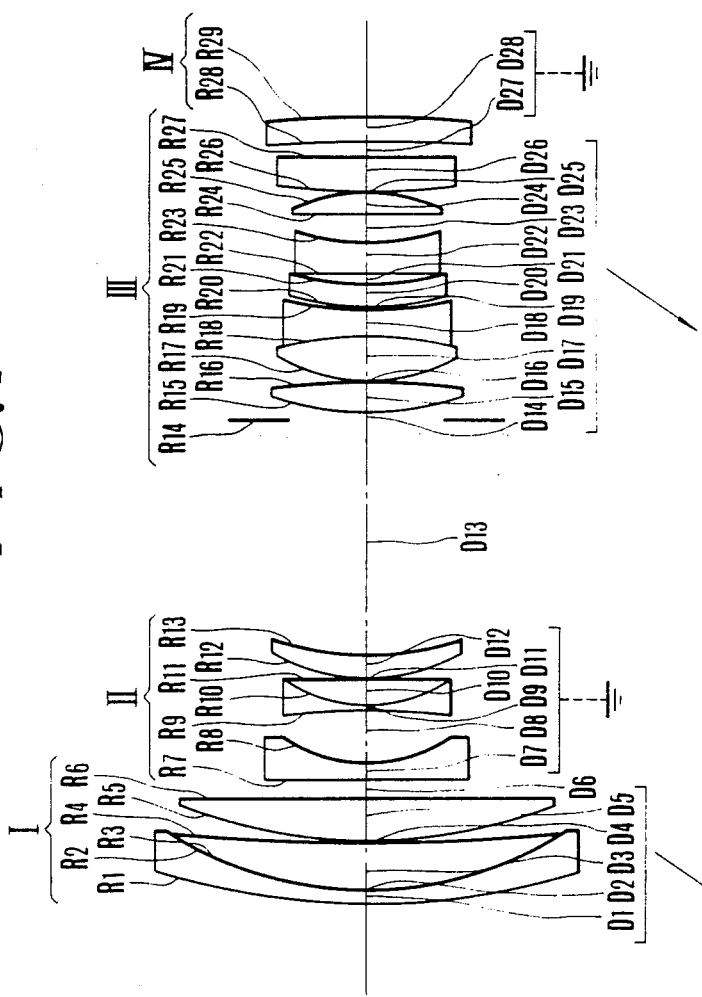
FIGS. 1, 3 and 5 are lens block diagrams of specific embodiments 1, 2 and 3 of the present invention respectively.
Figures 1, 2:
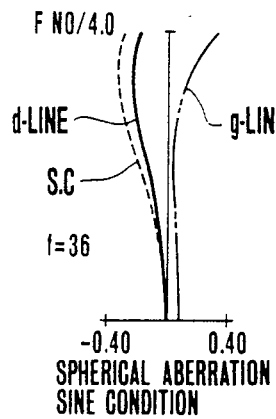
Figure 2:
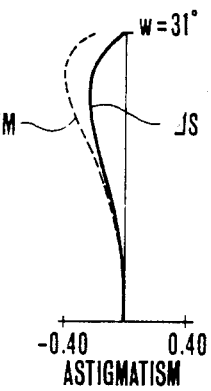
Figures 2, 3:
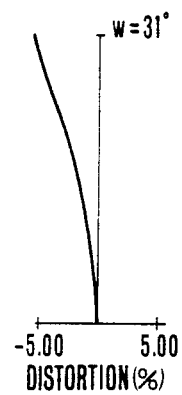
Figures 2, 3, 4:
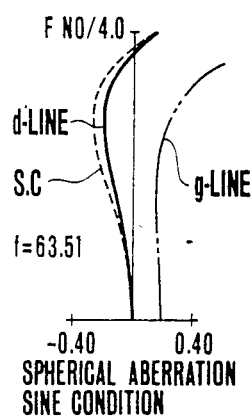
Figures 2, 3, 4, 5:
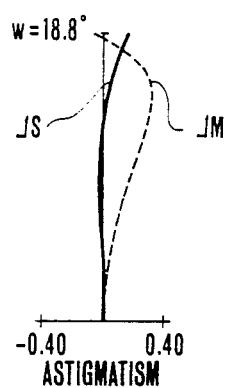
Figures 2, 3, 4, 5, 6:
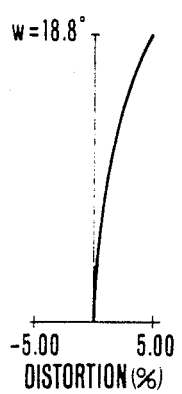
Figures 2, 3, 4, 5, 6, 7:
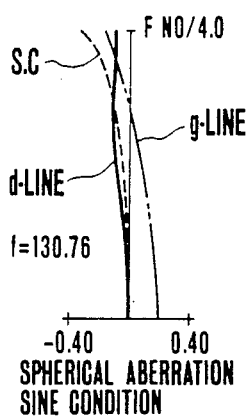
Figures 2, 3, 4, 5, 6, 7, 8:
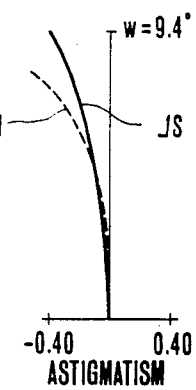
Figures 2, 3, 4, 5, 6, 7, 8, 9:
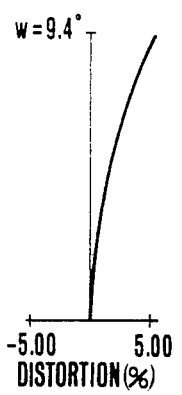
Figure 3:
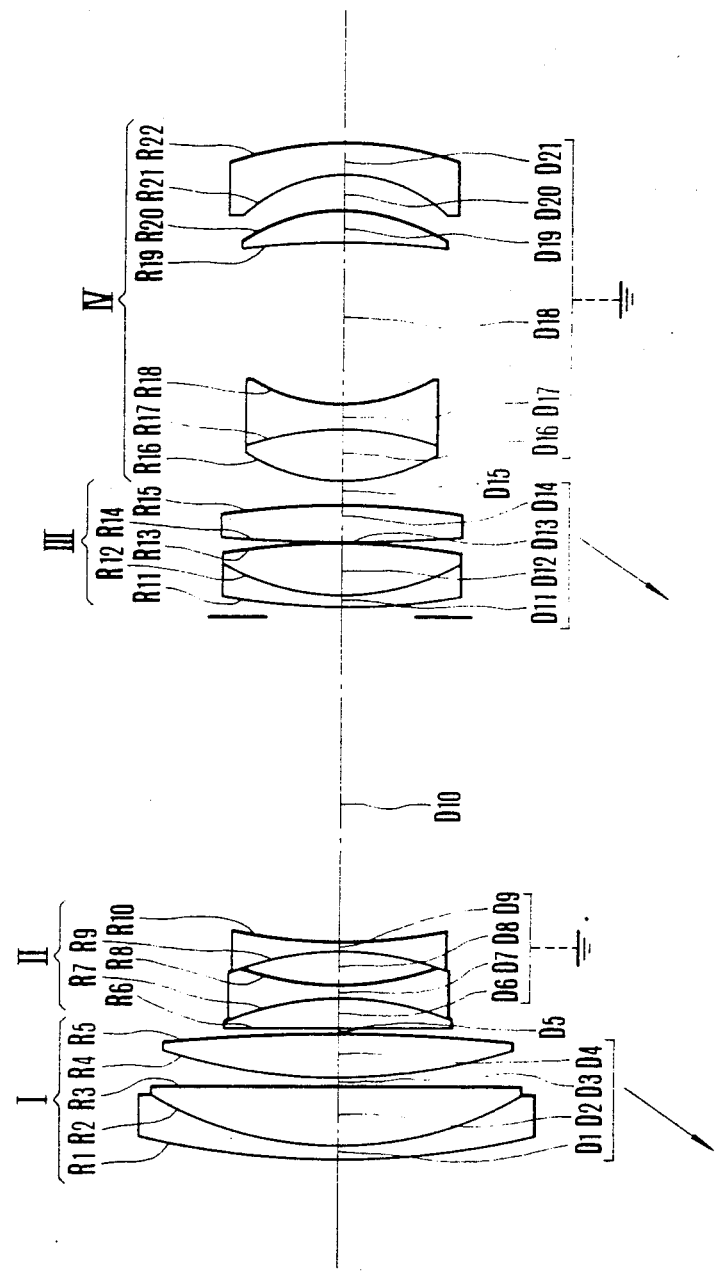
Figure 5:
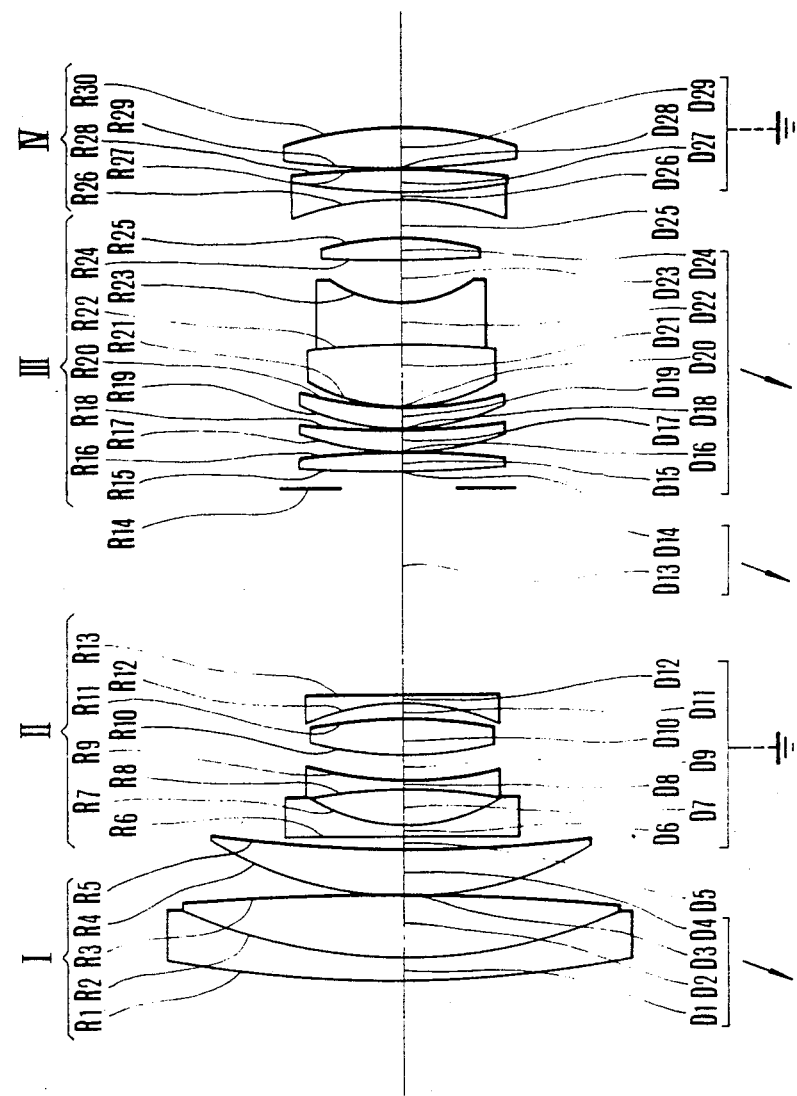

The zoom lens of the invention comprises, from front to rear, a first lens component I having a positive refractive power, a second lens component II having a negative refractive power, a third lens component III having a positive refractive power, and a fourth lens component IV for forming an image of an object. When zooming, the aforesaid second lens component is made to remain stationary, and the aforesaid first and third lens components are made to move in such a way that when in the telephoto position, they take more front positions than when in the wide angle position. Now, letting $\beta 2W$ and $\beta 2T$ denote the lateral magnifications for the wide angle and telephoto positions of the second lens component in the paraxial region respectively, the zoom ratio Z2 of the second lens component is given by:

$$Z2 = \frac{\beta 2T}{\beta 2W}$$

Also letting fI and fII denote the focal lengths of the first and second lens components respectively, e1W' the interval between the principal points of the first and second lens components, and $\Delta$e1' the distance by which the principal point interval e1W' is increased when zooming, we have the following equation:

$$\Delta e1' = (fI + fII - e1W')(1 - 1/Z2)$$

In the above equation, when $fI + fII - e1W' =$ constant, the larger the zoom ratio of the second lens component II, in other words, the larger the value of Z2, the longer the Δe1' becomes, or the wider the interval e1W' expands when zoomed to the telephoto position. In the case when the second lens component remains stationary, the quantity defined by Δe1' provides a measure for the difference between the physical lengths of the entire lens system in the wide angle and telephoto positions. Therefore, the zoom lens in the wide angle position is made shorter by that distance than in the telephoto position.

Also when the zoom ratio of the second lens component is constant, the smaller the focal length fII of the second lens component compared with the focal length fI of the first lens component, the longer the Δe1' becomes. It is, therefore, by the difference in Δe1' that the zoom lens can be shortened in the longitudinal direction at the wide angle position. In this connection, it should be noted here that, as far as the prior art is concerned, the fact that the focal length fII is taken at an extremely small value is not preferable on consideration of correction of the primary aberrations. Also as the focal length fII decreases, the difficulty of manufacturing the second lens component according to the given tolerances, and the discentering sensitivity becomes rapidly severer. For this reason, it has been the usual practice in the art to select a larger value than is desired as the appropriate one. In the zoom lens according to the present invention, however, because the second lens component is fixed in position during zooming, as compared with the prior art example of the second lens component functioning as the variator, a small value may be given for the focal length of the second lens component provided that the completed zoom lens can be manufactured as economically as possible while nevertheless permitting as good correction of aberrations as possible.

In a specific embodiment of the invention, letting fI, fII and fIII denote the focal lengths of the aforesaid first, second and third lens components, and fT the longest focal length of the entire system, the following conditions are satisfied:

$$0.45 < \frac{fI}{fT} < 0.75 \quad (1)$$

$$0.10 < \frac{|fII|}{fT} < 0.23 \quad (2)$$

$$0.2 < \frac{fIII}{fT} < 0.35 \quad (3)$$

Inequalities of condition (1) are concerned with the focal length of the first lens component. When the lower limit is exceeded, it is necessary for good correction of the primary aberrations and particularly spherical aberration in the telephoto position to increase the number of constituent lens elements. As a result, the diameter of the front elements is rapidly increased. When the upper limit is exceeded, because of the resultant long focal length of the first lens component, the required value of total axial movement of the first lens component becomes very large. Also when the focusing provision is made in the first lens component, the total focusing movement is increased. This leads to increase the diameter of the first lens component.

Inequalities of condition (2) are concerned with the focal length of the second lens component. When the lower limit is exceeded, though it is better with regard to the magnification power changing effect being increased, correction of the primary aberrations, particularly regarding spherical aberration and distortion, becomes difficult. When the upper limit is exceeded, the required value of total axial movement of each of the first and third lens components for obtaining the desired zoom ratio must be increased, thereby compactness is sacrificed.

Inequalities of condition (3) are concerned with the focal length of the third lens component. When the lower limit is exceeded, though it is better with regard to its total movement being decreased to effect the equivalent magnification power changing result, it is necessary for good correction of the primary aberrations particularly regarding spherical aberration and astigmatism to increase the number of constituent lens elements. In order to avoid mechanical interference with the second lens component, the physical length of the entire lens system must be increased. This also calls for an increase in the diameter of the first lens component.

Three examples of specific zoom lenses of the invention can be constructed in accordance with the numerical data given in the following tables for the radii of curvature, R, the axial thicknesses and axial air spacings, D, and the refractive indices, N, and Abbe numbers, $\nu$, of the glasses of the lens elements with subscripts numbered consecutively from front to rear, wherein the first lens component is denoted by I, the second lens component by II, the third lens component by III, the fourth lens component by IV, the focal length of the entire system by F, the F-number by FNO, and the angular field of view by $2\omega$.

Numerical Example 1

|  |  | F = 36.0–130.76 | FNO = 1:4.0 | $2\omega$ = 18.8°–62.0° |  |
|---|---|---|---|---|---|
| I | R1 = 98.314 | D1 = 1.80 | N1 = 1.80518 | $\nu$1 = 25.4 |
|  | R2 = 52.192 | D2 = 0.02 |  |  |
|  | R3 = 53.844 | D3 = 6.54 | N2 = 1.69680 | $\nu$2 = 55.5 |
|  | R4 = 458.722 | D4 = 0.12 |  |  |
|  | R5 = 89.367 | D5 = 4.44 | N3 = 1.69680 | $\nu$3 = 55.5 |
|  | R6 = 2920.068 | D6 = Variable |  |  |
| II | R7 = −520.762 | D7 = 1.06 | N4 = 1.88300 | $\nu$4 = 40.8 |
|  | R8 = 22.581 | D8 = 7.26 |  |  |
|  | R9 = −81.293 | D9 = 0.90 | N5 = 1.83400 | $\nu$5 = 37.2 |
|  | R10 = 23.882 | D10 = 3.20 | N6 = 1.84666 | $\nu$6 = 23.9 |
|  | R11 = −1167.579 | D11 = 0.12 |  |  |
|  | R12 = 33.756 | D12 = 3.20 | N7 = 1.80518 | $\nu$7 = 25.4 |
|  | R13 = 52.467 | D13 = Variable |  |  |
|  | R14 = Stop | D14 = 1.00 |  |  |
|  | R15 = 49.976 | D15 = 3.20 | N8 = 1.88300 | $\nu$8 = 40.8 |
|  | R16 = −292.389 | D16 = 0.12 |  |  |
|  | R17 = 25.873 | D17 = 6.20 | N9 = 1.63930 | $\nu$9 = 44.9 |
|  | R18 = −54.613 | D18 = 3.50 | N10 = 1.84666 | $\nu$10 = 23.9 |

-continued

| | | | | |
|---|---|---|---|---|
| III | R19 = 47.829 | D19 = 0.59 | | |
| | R20 = 60.382 | D20 = 2.85 | N11 = 1.49831 | $\nu 11$ = 65.0 |
| | R21 = 104.765 | D21 = 1.05 | | |
| | R22 = −173.517 | D22 = 3.38 | N12 = 1.80610 | $\nu 12$ = 40.9 |
| | R23 = 25.605 | D23 = 4.04 | | |
| | R24 = 90.462 | D24 = 3.09 | N13 = 1.48749 | $\nu 13$ = 70.1 |
| | R25 = −31.882 | D25 = 0.12 | | |
| | R26 = 100.106 | D26 = 4.21 | N14 = 1.61800 | $\nu 14$ = 63.4 |
| | R27 = −729.101 | D27 = Variable | | |
| IV | R28 = −215.445 | D28 = 2.80 | N15 = 1.61800 | $\nu 15$ = 63.4 |
| | R29 = −108.605 | | | |

| f | 36.00 | 63.51 | 130.76 |
|---|---|---|---|
| D6 | 3.03 | 16.49 | 31.30 |
| D13 | 29.34 | 16.07 | 0.28 |
| D27 | 2.0 | 15.27 | 31.06 |

$\dfrac{f1}{fT} = 0.6599 \qquad \dfrac{|f2|}{fT} = 0.1874 \qquad \dfrac{f3}{fT} = 0.3109$

Numerical Example 2

| F = 51.6–195.09 | FNO = 1:4.0 | 2ω = 12.6°–45.4° |
|---|---|---|

| | | | | |
|---|---|---|---|---|
| I | R1 = 133.05130 | D1 = 2.8 | N1 = 1.80518 | $\nu 1$ = 25.4 |
| | R2 = 59.55190 | D2 = 6.3 | N2 = 1.43387 | $\nu 2$ = 95.1 |
| | R3 = 926.53642 | D3 = 0.1 | | |
| | R4 = 63.89169 | D4 = 5.6 | N3 = 1.60562 | $\nu 3$ = 43.7 |
| | R5 = −1078.87057 | D5 = Variable | | |
| II | R6 = 607.48246 | D6 = 4.0 | N4 = 1.84666 | $\nu 4$ = 23.9 |
| | R7 = −45.99987 | D7 = 1.5 | N5 = 1.69680 | $\nu 5$ = 55.5 |
| | R8 = 51.25210 | D8 = 3.983 | | |
| | R9 = −42.48356 | D9 = 1.5 | N6 = 1.77250 | $\nu 6$ = 49.6 |
| | R10 = 172.62281 | D10 = Variable | | |
| III | R11 = 102.34454 | D11 = 1.5 | N7 = 1.84666 | $\nu 7$ = 23.9 |
| | R12 = 43.29393 | D12 = 6.0 | N8 = 1.61800 | $\nu 8$ = 63.4 |
| | R13 = −108.15183 | D13 = 0.1 | | |
| | R14 = 197.30914 | D14 = 4.0 | N9 = 1.77250 | $\nu 9$ = 49.6 |
| | R15 = −97.89799 | D15 = Variable | | |
| IV | R16 = 23.46285 | D16 = 6.5 | N10 = 1.62280 | $\nu 10$ = 57.0 |
| | R17 = −53.25571 | D17 = 2.5 | N11 = 1.77250 | $\nu 11$ = 49.6 |
| | R18 = 23.87100 | D18 = 20.132 | | |
| | R19 = −173.49776 | D19 = 4.5 | N12 = 1.61375 | $\nu 12$ = 56.4 |
| | R20 = −26.03247 | D20 = 4.345 | | |
| | R21 = −22.97578 | D21 = 4.18 | N13 = 1.77250 | $\nu 13$ = 49.6 |
| | R22 = −47.50335 | | | |

| f | 51.6 | 100 | 195.09 |
|---|---|---|---|
| D5 | 1.541 | 21.541 | 37.320 |
| D10 | 42.732 | 25.023 | 5.681 |
| D15 | 3 | 20.709 | 40.055 |

$\dfrac{f1}{fT} = 0.548 \qquad \dfrac{|f2|}{fT} = 0.1589 \qquad \dfrac{f3}{fT} = 0.256$

Numerical Example 3

| F = 36–131.06 | FNO = 1:4.0 | 2ω = 18.8°–62° |
|---|---|---|

| | | | | |
|---|---|---|---|---|
| I | R1 = 203.976 | D1 = 2.50 | N1 = 1.80518 | $\nu 1$ = 25.4 |
| | R2 = 67.066 | D2 = 9.01 | N2 = 1.69680 | $\nu 2$ = 55.5 |
| | R3 = −353.880 | D3 = 0.12 | | |
| | R4 = 55.758 | D4 = 5.53 | N3 = 1.69680 | $\nu 3$ = 55.5 |
| | R5 = 184.608 | D5 = Variable | | |
| II | R6 = 235.238 | D6 = 1.50 | N4 = 1.88300 | $\nu 4$ = 40.8 |
| | R7 = 23.487 | D7 = 5.04 | | |
| | R8 = −75.474 | D8 = 1.20 | N5 = 1.80400 | $\nu 5$ = 46.6 |
| | R9 = 47.273 | D9 = 3.27 | | |
| | R10 = 40.714 | D10 = 4.88 | N6 = 1.80518 | $\nu 6$ = 25.4 |
| | R11 = −46.433 | D11 = 1.86 | | |
| | R12 = −34.117 | D12 = 0.90 | N7 = 1.79952 | $\nu 7$ = 42.2 |
| | R13 = −427.842 | D13 = Variable | | |
| | R14 = Stop | D14 = Variable | | |
| | R15 = 143.647 | D15 = 2.50 | N8 = 1.72000 | $\nu 8$ = 50.2 |
| | R16 = −220.374 | D16 = 0.12 | | |
| | R17 = 57.016 | D17 = 2.50 | N9 = 1.65844 | $\nu 9$ = 50.9 |
| | R18 = 123.461 | D18 = 0.12 | | |
| | R19 = 33.272 | D19 = 3.03 | N10 = 1.62004 | $\nu 10$ = 36.3 |

-continued

| | | | | |
|---|---|---|---|---|
| III | R20 = 75.701 | D20 = 0.12 | | |
| | R21 = 24.716 | D21 = 7.35 | N11 = 1.51742 | ν11 = 52.4 |
| | R22 = −241.028 | D22 = 5.57 | N12 = 1.84666 | ν12 = 23.9 |
| | R23 = 18.530 | D23 = 5.36 | | |
| | R24 = 96.485 | D24 = 2.68 | N13 = 1.66672 | ν13 = 48.3 |
| | R25 = −54.371 | D25 = Variable | | |
| IV | R26 = −50.660 | D26 = 1.40 | N14 = 1.77250 | ν14 = 49.6 |
| | R27 = 153.277 | D27 = 2.25 | N15 = 1.56965 | ν15 = 49.4 |
| | R28 = −347.010 | D28 = 0.60 | | |
| | R29 = 141.986 | D29 = 4.79 | N16 = 1.64850 | ν16 = 53.0 |
| | R30 = −50.727 | | | |

| | | | |
|---|---|---|---|
| f | 36.0 | 70.0 | 131.06 |
| D5 | 1.423 | 15.867 | 26.543 |
| D13 | 27.481 | 13.037 | 2.361 |
| D14 | 2.503 | 3.216 | 0.822 |
| D25 | 4.962 | 18.692 | 31.763 |

$$\frac{f1}{fT} = 0.585 \qquad \frac{|f2|}{fT} = 0.168 \qquad \frac{f3}{fT} = 0.293$$

In the third numerical example, a diaphragm is made to move in unison with the first lens component. The use of such arrangement has, despite even when the third lens component moves non-linearly, to enable the axial movement of the diaphragm to be linear with an advantage that an operating mechanism can be constructed in a simple form.

As has been described in greater detail above, according to the present invention, the principle of construction of a zoom lens for greatly extended range and an excellent state of correction of the image aberrations is set forth by a very simple structure of zoom control such that movements of the first and third lens components suffice. This produces an advantage that the physical length of the lens in the wide angle setting is remarkably shortened so that it becomes convenient to carry about the camera with that zoom lens, although the zoom lens is of high zoom ratio.

What we claim:

1. A zoom lens comprising:
a first lens component of positive refractive power, a second lens component of negative refractive power, a third lens component of positive refractive power and a fourth lens component for forming an image, in the order from the front, zooming being performed by moving said first lens component and said third lens component while said second lens component being held stationary, wherein when zoomed to the telephoto position, each of said first and said third lens components lies in more front a position than when in the wide angle position, and satisfying the following conditions $$0.45 < \frac{fI}{fT} < 0.75$$

$$0.1 < \frac{|fII|}{fT} < 0.23$$

$$0.2 < \frac{fIII}{fT} < 0.35$$

wherein fI, fII and fIII denote the focal lengths of said first, said second and said third lens components respectively, and fT the longest focal length of the entire system.

2. A zoom lens according to claim 1, further comprising a diaphragm arranged in a space between said second lens component and said third lens component, said diaphragm moving together with said first lens component when zooming is performed.

* * * * *